United States Patent [19]
Liang

[11] Patent Number: 5,959,007
[45] Date of Patent: Sep. 28, 1999

[54] BITUMINOUS COMPOSITIONS PREPARED WITH PROCESS TREATED VULCANIZED RUBBERS

[75] Inventor: Zhi-Zhong Liang, Richmond Hill, Canada

[73] Assignee: Polyphalt L.L.C., Salt Lake City, Utah

[21] Appl. No.: 08/974,960

[22] Filed: Nov. 20, 1997

Related U.S. Application Data

[63] Continuation-in-part of application No. 08/464,874, filed as application No. PCT/CA93/00562, Dec. 29, 1993, Pat. No. 5,719,215.

[30] Foreign Application Priority Data

Dec. 29, 1992 [GB] United Kingdom .................. 9227035

[51] Int. Cl.$^6$ ............................. C08K 5/01; C08L 91/08
[52] U.S. Cl. ................. 524/62; 524/70; 524/71; 521/41; 521/44.5; 521/45.5
[58] Field of Search .................. 524/62, 70, 71; 521/41, 44.5, 45.5

[56] References Cited

U.S. PATENT DOCUMENTS 5,719,215   2/1998   Liang et al. .............................. 524/62

FOREIGN PATENT DOCUMENTS 0 439 232 A1   7/1991   European Pat. Off. .................. 524/62

*Primary Examiner*—Frederick Krass
*Attorney, Agent, or Firm*—Sim & McBurney

[57] ABSTRACT

Stable rubberized bitumen concentrates are prepared by initially forming a mass comprising bitumen and crumb rubber particles in an amount of at least about 15 wt % of the mass with the crumb rubber being swollen in-situ, and applying shear and temperature conditions to the mass to dissociate the vulcanizate network of the rubber particles and to incorporate the digested vulcanizate into the bitumen. The stable rubberized bitumen concentrate is stable against sedimentation of rubber particles both following storage of the concentrate at about 320° F. for 48 hours and dilution to a lower concentration in the ASTM solubility test.

16 Claims, No Drawings

BITUMINOUS COMPOSITIONS PREPARED WITH PROCESS TREATED VULCANIZED RUBBERS

REFERENCES TO RELATED APPLICATION

This application is a continuation-in-part of U.S. patent application No. 08/464,874 filed Dec. 29, 1993 (now U.S. Pat. No. 5,719,215) which is a national stage of PCT/CA93/00562 filed Dec. 29, 1993.

FIELD OF THE INVENTION

The present invention relates to a process for digesting ground rubber vulcanizate into bitumen to form a rubberized bitumen concentrate whereby the concentrates may be used on their own or for blending with various types and grades of bitumen and polymeric additives to prepare rubber and/or plastics stabilized bituminous compositions for diverse asphalt applications.

BACKGROUND TO THE INVENTION

It is well known that many desirable characteristics of bitumen can be improved by combining with it certain polymeric materials, especially elastomeric materials. For example, European Patent Publication No. 317,025 to Shell International Research disclosed a bitumen composition useful in road paving applications containing an asymmetric radial block copolymer which exhibits increased toughness and tenacity. PCT Publication No. WO 90/02776 to Elf Aquitaine, disclosed a rubberized bituminous composition which was modified through in-situ vulcanization of a copolymer of styrene and a conjugated diene with a coupling agent, such as sulfur.

The incorporation of crumb rubber from recycled automobile and other tires into bitumen or asphalt is desirable in view of the potentially improved properties of composition attained thereby and the recycle of scrap rubber achieved thereby.

Scrap crumb rubber represents a significant source of rubber vulcanates, which contain a variety of rubber polymers, predominantly styrene-butadiene rubber. Crumb rubber generally is recycled rubber that has been reduced to ground or particulate form by mechanical shearing or grinding. It has been proposed that scrap crumb rubber be incorporated into asphalt paving materials. In general, crumb rubber is blended into asphalt paving materials by one of two processes, namely a wet process or a dry process.

In the dry process, the rubber crumb is added to the heated aggregate, not the asphalt cement, or to the hot mix asphalt mixture during production of the mix. In such dry mix processes, beneficial chemical changes to the asphalt binder, such as bond-cleavage or stabilization of additives, are extremely unlikely.

In wet processes, on the other hand, beneficial changes to the properties of the binder, such as those disclosed in the present invention, can be readily achieved by the appropriate blending of additives, usually polymers. In practice, the crumb rubber is blended into the asphalt cement, by batch blending in which batches of crumb rubber and asphalt are mixed in production, by continuous blending with a continuous production system, or by terminal blending. An asphalt cement binder that has been modified with crumb rubber is termed asphalt rubber.

In one wet procedure in which polymers are used, hot asphalt (about 190° to 220° C.) is mixed with approximately 25 to 30 wt % crumb rubber and the mixture then is diluted with kerosene. A variation of this procedure uses about 22 wt % crumb rubber with dilution being effected using extender oil. It is thought that blending the crumb rubber and asphalt at elevated temperature may promote limited chemical bonding of the components. However, these compositions exhibit only short-term stability and, therefore, must be employed shortly after formation.

A recent variation of the wet process is described in U.S. Pat. No. 4,992,492. The process involves a mixture of asphalt or sulfur-treated asphalt (81 to 86%), crumb rubber (8 to 10%), extender oil (4 to 6%) and a high molecular weight (>100,000) olefinically-unsaturated synthetic rubber (2 to 3%) which is blended together at 175° to 180° C. for about two hours.

As claimed, this process differs from the present invention in a number of important facets. In the referenced process, the ground crumb rubber is dispersed in the bitumen, however, the vulcanizate network undergoes limited, if any, chemical disassociation. Such crumb rubber compositions would be unstable without the incorporation of the claimed high MW ($\geq$100,00) olefinically-unsaturated synthetic rubber. The high MW free solvated synthetic rubber chains likely act to minimize changes in viscosity and softening point over periods of up to 10 days in a "hermetically-sealed vessel without agitation at 160° C. to 165° C." to promote stability. Other variations of the wet process are described in WO 95/20623 and EP 439,232.

In WO 93/17076, ground rubber particles are heavily oxidized, particularly at the surface of the particles, with air injected under pressure at a high temperature (220° C. to 260° C.), in a procedure similar to that employed conventionally for producing an oxidized or "blown" asphalt for roofing-grade asphalt. Such treatment of the fine rubber particles in situ improves desired rubber dispersibility and compatibility, but also may imparts undesirable brittleness to the asphalt matrix.

SUMMARY OF THE INVENTION

The present invention relates to a process for digesting (or "devulcanizing") ground rubber vulcanizate particles into bitumen to form a rubberized bitumen concentrate and also relates to the use of the concentrate to blend with various types and grades of bitumen and polymeric additives to prepare rubber and/or plastics modified bituminous compositions for diverse bituminous applications in the paving, roofing, coating, waterproofing and industrial product markets. The invention includes the rubberized bituminous compositions which result from the process.

According to one aspect of the present invention, there is provided a stable rubberized bitumen concentrate, comprising bitumen, and dissociated rubber vulcanizate network comprising at least about 15 wt % of said composition and incorporated into the bitumen to the extent that rubber particles in the composition do not sediment as determined by the Polymer Separation Test and upon dilution by bitumen to a lower concentration of dissociated rubber vulcanate network. The Polymer Separation test is described below.

The rubber vulcanate network may comprise at least about 5 wt %, preferably at least about 25 wt %. of the composition and up to 50 wt % or higher. The concentrate may be diluted by bitumen to a lower concentration of dissociated rubber vulcanate network for utilization at much lower concentration.

The present invention provides, in a further aspect thereof, a bituminous composition and a concentrate as provided herein as a modifier of the bitumen. The modifier may be an independent modifier of the bitumen or may be a co-modifier with at least one synthetic rubber.

Such synthetic rubber may be an elastomeric copolymer, including:

styrenic copolymers, such as styrene-butadiene rubber (SBR), styrene-butadiene-styrene block copolymers (SBS), styrene-ethylene-butadiene-styrene block copolymers (SEBS) and styrene-isoprene-styrene block copolymers (SIS);

olefinic copolymers, such as polypropylene copolymers, ethylene-vinyl acetate copolymers (EVA), ethylene methylacrate copolymers (EMA) and ethylene propylene diene copolymers (EPDM).

other polymers, such as nitrile-butadiene rubber (NBR), polyvinylchloride (PVC), polyisobutene, and polybutadiene (PB).

Mixtures of two or more of such polymers may be incorporated into the bituminous composition along with the concentrate.

In an additional aspect of the invention, there is provided a stable bituminous composition comprising a dispersion of particulate polyolefin in bitumen wherein the concentrate provided herein is a component stabilizing the particulate polyolefin against sedimentation.

The present invention, in another aspect, provides a method of forming a rubberized bitumen concentrate which comprises (A) providing a mass comprising (a) bitumen, and (b) crumb rubber having a vulcanizate network in an initial amount of at least about 15 wt % of the mass, wherein the crumb rubber is swollen in-situ to form a network-like structure in the bitumen susceptible to dissociation of vulcanizate particles in a high shear field; and (B) subjecting the mass to sufficient shear and temperature conditions to effect dissociation of the vulcanizate network of the rubber particles to incorporate the digested vulcanizate into the bitumen to the extent that rubber particles in the composition do not sediment as determined by the Polymer Separation Test and upon dilution by bitumen to a lower concentration of dissociated rubber vulcanate network.

The crumb rubber which is processed according to the method of the invention may have a wide range of particle size generally from about ½ inch to about 200 mesh, preferably about 10 to about 80 mesh. A process oil may be included in a manner to promote swelling of the crumb rubber and to increase the solvency power of the bitumen.

By the shear and temperature condition, the mass may be subjected to thermal and mechanical energy at a shear stress at least sufficient to effect intra-particulate fraction and shearing to effect breakdown of the vulcanate network under the influence of the shear stress applied to the mass of particles. The shear and temperature conditions preferably are applied for a time which results in any carbon black particles released from the rubber particles remaining dispersed and resistant to sedimentation.

At least one additional loading of crumb rubber may be made to the initially-formed rubber concentrate and the method is repeated to incorporate digested vulcanate network from each additional loading into the rubberized bitumen concentrate.

The rubberized bitumen concentrate produced by the method of the invention may be diluted to a lower concentrate of incorporated rubber particles for use in the diluted form for a variety of bitumen uses.

Definition

Since the process of vulcanization is irreversible, the term "devulcanizatiori" is something of misnomer. The in-situ devulcanization of rubber vulcanizate in this invention means that the structured network (or chemically cross-linked nature) of ground vulcanizate rubber (i.e. tire rubber and other industrial rubber waste) is dissociated or broken up and the resulting devulcanized material is incorporated directly into bitumen to a point where the treated vulcanizate can be fully digested or stabilized in bitumen and does not separate from bitumen in hot liquid form over a long period of time at different concentration levels. The present invention requires the use of specific components to achieve the stable incorporation of the devulcanized rubber particles into bitumen as described in more detail below.

GENERAL DESCRIPTION OF INVENTION

The Elements (as defined in Table 1 below) required for the provision of the composition of the present invention and used in the process of the invention are described in detail below. The Elements are:

1) Bitumen or Asphalt (sometimes abbreviated "AC" herein)
2) Ground Rubber
3) Swollen rubber particles in AC or AC-oil combination (from elements (1) and (2))
4) Minimum loading level of ground rubber in asphalt of at least about 15 wt %

The combination of Elements 1, 2, 3 and 4 is sometimes referred to herein as a "mass". The following Table I provides more detailed information relating to the Elements.

TABLE 1

| Element | Definition/Comments/Examples | Required in process |
|---|---|---|
| Bitumen/ Asphalt | may be from a wide variety of sources, including straight run vacuum residue, mixtures of vacuum residue with a variety of diluents, such as vacuum tower wash oil, paraffin distillate, petroleum flux, aromatic and napthenic oils. Other asphaltic materials, such as rock asphalt, naturally occurring asphalt or air blown asphalt and coal tar may also be used. | Yes |
| Ground Rubber (GR) | most types of crumb rubber (vulcanizate) from whole tire, tire treads, tire buffing, tire side wall and other industrial/commercial waste, such as EPDM scrap, conveyor belt and so on. General size range: low mesh - about ½ inch +/high mesh up to about 200 mesh, conveniently about 10 to about 80 mesh. | Yes |
| GR Swollen in-situ | the GR particles in the bitumen need to be swollen sufficiently in bitumen or bitumen-oil combination while shear mixing. If the GR particles are not swollen in-situ under the specified process conditions, these types of the GR vulcanizates may not be processed according to the invention. For example, nitrile rubber and neoprene rubber are highly resistant to bitumen or any other hydrocarbon oils in terms of solubility, and hence their crumb vulcanizes may not be processed according to the invention. | Yes |
| Minimum effecting loading level of GR | the GR swollen in bitumen is required to be at a certain high initial loading level of at least about 15% by wt. The particles are required to be swollen sufficiently, along with the minimum initial effective loading level, to tend to form a network-like-structure in the bitumen medium to facilitate the dissociation of vulcanizate particles in a high shear field. If the loading level is too low, usually the vulcanizate particle are swollen but do not | Yes |

TABLE 1-continued

| Element | Definition/Comments/Examples | Required in process |
|---|---|---|
| | become dissociated in the high shear field. The low end limitation (15% by wt) is based on our several years experimentation with this invention. An optimized higher starting load level can vary depending upon multiple factors, such as vulcanizate source, type, composition/formulation and additives involved and also largely upon the parameters of the blending equipment. | |
| Process oil | Process oils include aromatic and naphthalene oils, petroleum flux, and other hydrocarbon oils. Addition of any oil is intended to promote the swollen degree of the crumb rubber (or vulcanizate) in the bitumen medium and to improve the solvency power of the bitumen, rather than reducing viscosity of the end product application, as in the conventional wet process. With some crumb rubbers, the oil is required by the process because of the differences in vulcanizate materials, including type, formulation, cross-linking chemicals and so on from rubber industries. | Optional |

In summary of the above discussion with respect to Table I, there are four types of GR vulcanizate, which may behave differently according to the invention: GR type one works well with asphalt only; GR type two works well with aromatic oil in asphalt to facilitate particle swelling; GR type three works well in either case; and GR type four does not work in either case.

Only with the presence of all four, or optionally five, of the above-described Elements is it possible to provide the essential materials and conditions for carrying out the present invention. The crumb rubber is mixed with asphalt at the required loading level and the crumb rubber particles are swollen in-situ by hydrocarbon oils present in the asphalt, either in-situ or added, as required to permit penetration of the oil into the surface of the crumb rubber particles and the softening and swelling of the structure. The resulting "imass" is processed.

The "mass" comprising the four essential or optionally five elements must then be subjected to sufficient shear and temperature conditions in order to effect devulcanization of the rubber particles. The mass is subjected to thermal and mechanical energy at a shear stress at least sufficient to effect intra-particulate friction and shearing to commence breakdown of the vulcanized rubber particles, probably through breakdown of sulfur—sulfur bonds, sulfur-carbon bonds and cross-links between polymer molecules, under the influence of the shear stress applied to the mass of particles. This operation increases the solubility and compatibility of the at least partially dissociated rubber vulcanizate network into the bituminous phase.

With these conditions of shear and temperature acting upon the "mass", the cross-linked network present in the rubber vulcanizate can become substantially disassociated (or broken down). This mass must be processed to a point where the vulcanizate can be fully digested, or completely incorporated, into the asphalt to form a rubberized asphalt concentrate.

The conditions used for the dissociation of the vulcanized rubber particles depends on a number of factors, as discussed below. In particular, the temperature may range from about 100° to about 300° C. with mechanical energy being applied to the particles to produce intra-particulate friction and shearing at a shear stress which may vary significantly depending on other processing parameters, but which is at least sufficient to effect breakdown of the mass of particles. For example, processing of the ground crumb rubber at lower temperatures may require use of higher intra-particulate shear stresses while lower intra-particulate shear stresses may be possible at more elevated temperatures. The heat and mechanical energy may be applied over a period of time which may vary widely, from about 15 minutes to about 8 hours or more, depending on the components employed, processing parameters and the nature of the product desired. In addition, the process may be effected continuously.

In general, the process according to the present invention to effect at least partial dissociation of the crumb rubber vulcanizate network is controlled by a number of variable factors, including type of hydrocarbon oil, initial concentration of oil in bitumen, process conditions employed, such as equipment type, intra-particulate shear stress, temperature and the interrelation of shear rate and temperature, the use of additional devulcanization agents, the timing of addition of crumb rubber, size and loading rates, amount and timing of addition of a cross-linking agent, as discussed below, and the molecular weight and type of any rubber added to the composition, as well as the functionality of the rubber, if applicable. By utilizing this combination of parameters, the degree of dissociation of the scrap rubber may be controlled to produce a variety of products.

The application of heat and mechanical energy to the dispersed swollen crumb rubber particles in the bitumen is carried out at a shear stress at least sufficient to effect intra-particulate friction and shearing to cause dissociation of the rubber vulcanate network and a continuous reduction in the rubber vulcanate particle size, the degree of particle size reduction depending on the length of time for which the shear stress is applied to the composition, in addition to the other process parameters discussed above. If such processing is effected for a sufficient duration, all the rubber particles become dissociated and incorporated into the bitumen, so that rubber particles in the composition do not sediment according to the Polymer Separation Test, as outlined below, and upon dilution with bitumen to a lower concentration of dissociated rubber vulcanate network.

However, such shear stress processing may be effected for a sufficient duration that the rubber vulcanate network is heavily dissociated, in which case an oil-like liquified material is produced, which may be less desirable for use in hot mix paving and roofing related applications. Such oil-like liquified materials may be better suited for use as a diluent in asphalt and non-asphalt based coatings and sealants.

The ability to disassociate the rubber vulcanizate in situ leads to a lower viscosity product than the rubber/bitumen mixture at its starting loading level. This result, in turn, permits incremental loading of crumb rubber into the rubberized asphalt concentrate. Within the scope of the invention, it is possible to achieve loading levels of rubber in the asphalt up to about 50% or greater by effecting such incremental loadings. This result is in contrast to conventional procedures wherein the mixture runs dry at relatively low levels.

The rubberized concentrate which results from the process of the invention is also unique in that the composition is stabilized indefinitely against phase separation of the devulcanized rubber from the bitumen composition. The dramatic improvement in stability of the concentrate which results from the present invention, as compared to a similar formulation not prepared according to the conditions of the invention, may not be fully appreciated until both materials are re-examined at diluted concentrations as in the form that they would ultimately be used. Subsequent dilution of the rubberized concentrate which results from the procedure of the present invention, may be effected to virtually any lesser concentration, with no phase separation of the devulcanized rubber from the asphalt matrix.

Further materials may be added to the devulcanized composition to impart particular properties thereto, for example, additional loadings of carbon black and/or addition of gilsonite.

Crumb rubber from automobile tyres generally contains a significant proportion of carbon black. The dissociation procedure used herein tends to cause a release of carbon black particles from the crumb rubber. Typically, such carbon black particles would separate from the continuous bitumen phase, by means of sedimentation. In the present invention, the stability of the released carbon black is improved through the surface grafting of the at least partially dissociated rubber vulcanate network onto these particles during free radical chain transfer reaction and carbon black particles dispersed in the liquid vulcanate rather than sediment.

In general, the highly dissociated material may be dispersed in bitumen and remain in the liquid phase as a colloidal dispersion. However, at intermediate stages between the commencement of dissociation and the formation of highly dissociated material in which sedimentable dispersed degraded rubber particles remain, in order to provide a stable dispersion of such degraded rubber particles in bitumen, it is necessary for chemical reaction to be effected by way of cross-linking of an unsaturated rubber component, which may comprise vulcanate from a prior degradation, in order for the degraded rubber particles to be stabilized against sedimentation from the bitumen.

An important aspect of the present invention is the ability to control the degree or level of dissociation of the rubber vulcanate network. Materials of certain levels of disassociation may be used independently or advantageously combined together, with or without additional modifiers, as discussed above.

The highly dissociated rubber vulcanate network which has been solubilized or compatibilized in the bitumen can subsequently be re-vulcanized in-situ through the use of commonly employed cross-linking agents. This revulcanized modified bitumen exhibits improved elasticity and stiffness without risk of phase separation due to irreversible chemical bonding into the bitumen.

Such cross-linking and/or grafting may be effected using any convenient cross-linking agent, including sulfur, sulfur donor, with or without accelerating additives, and other free-radical initiators, such as hydrogen peroxide. In general, the amount of cross-linking agent employed is about 0.05 to about 5 wt %, preferably about 0.2 to about 3 wt % of bitumen. The cross-linking agent may be added at any convenient stage of processing.

In another embodiment of the invention, vulcanized crumb rubber particles may be added and incorporated into the above described highly dissociated rubberized asphalt composition, with our without partial degradation thereof. In such compositions the at least partially dissociated rubber network may chemically bind on the surface of the rubber vulcanate particles thereby creating stable compositions.

Incremental batch loadings of crumb rubber particles may be employed to provide a very high overall loading of dispersed stabilized rubber in the product bitumen composition, generally in the range of about 15 to about 80 wt %, preferably about 25 to about 50 wt % and up to about 75 wt %. Such concentrated material, or masterbatch, may be diluted with bitumen to form a composition containing a desired concentration of stabilized crumb rubber, generally in the range of about 3 to about 40 wt %, for a variety of asphalt applications, including all types of paving, preformed paving bricks, roofing membranes, shingles, waterproofing membranes, sealants, caulks, potting resins and protective finishes. Alternatively, such masterbatch may be compounded with fillers and/or polymers and the compounded composition may be pelletized to produce a pelletized composition for subsequent incorporation into asphalt compositions for such uses.

In published International patent application WO 93/07219 (corresponding to U.S. Pat. Nos. 5,280,064 and 5,494,966, the disclosures of which are incorporated herein by reference), there is described the provision of stable asphalt compositions in which polyethylene particles are maintained as a dispersed phase by steric stabilization. As described therein, the bitumen comprises the major continuous phase of the polymer-modified bitumen compositions and the polymer is dispersed in the bitumen by steric stabilization achieved by a first component anchored to the polymer phase and a second component bonded to the first component and soluble in the bitumen.

In addition, as described in published International Patent Application No. WO 94/14896, in the name of Polyphalt Inc, additional homopolymer or copolymer components, including styrenic copolymers, olefinic copolymers and E-P rubbers may be provided in the bitumen composition, in the form of particle dispersions, strand-like dispersions, solutions and combinations in which the additional homopolymer and copolymer components are stabilized against separation.

The at least partially dissociated rubber vulcanate network produced in the manner described above may be added, as is or stably dispersed in bitumen, to these bitumen compositions so that the residual rubber crumb particles form part of the stable dispersed phase and may provide supplementation to or partial replacement for the polyethylene or other polymer particles in such compositions. The unsaturated components of the at least partially dissociated rubber vulcanate network and any unsaturated rubber added may be employed to replace polybutadiene-based stabilizer, in whole or in part, as the steric stabilizer. If the unsaturated rubber is used in the production of the at least partially dissociated rubber vulcanate network and is functionalized, then this unsaturated rubber can be used to replace the second component which is bonded to the first component and anchored to the dispersed polymer, as described above.

The formation of stable dispersions of crumb rubber in bitumen by the procedure employed herein may be combined with stabilization of dispersed polyethylene and other olefinic polymers and copolymers, as described above, to improve the characteristics thereof. Paving materials generally include aggregate, such as crushed stone pebbles, sand etc, along with the bitumen composition. Similarly, other additives to the bitumen composition may be employed, dependent on the end use to which the bituminous composition is put. For example, a roofing material may be obtained by the addition of suitable fillers, such as asbestos, carbonates, silica, wood fibres, mica, sulfates, clays, pigments and/or fire retardants, such as chlorinated waxes. For crack-filler applications, an oxide may be advantageously added.

Mechanism

The mechanisms by which the shear force acting on the mass composition described above can serve to effect dissociation of the swollen rubber network present in the vulcanizate/bitumen mixed in a conventional high shear mixer under a specified process condition are not at present fully understood. But without wishing to be restricted to any theory, the process of the invention is considered to result in the breakage of sulfur—sulfur, sulfur-carbon or other cross-linking bonds and possibly breakage of carbon—carbon bonds present in the vulcanizate cross-linking structure to a point such that the treated vulcanizate rubber can be fully digested or stabilized in bitumen and does not separate from bitumen in hot liquid form over a long period of time at different concentration levels.

Applications for Devulcanized Rubberized Concentrate

The rubberized bituminous concentrates which result from the procedure of the present invention may be employed in a variety of applications, in undiluted or bitumen-diluted form, as described above and summarized below:

1) The rubberized bituminous concentrate which results from the process of the invention is characterized by:
    a processable binder containing a high loading from about 15 up to about 50% or higher at elevated temperature.
    a stable, unique heterogeneous compound mixture with all the rubber vulcanizate digested.

The concentrate may be used as an end product in some industrial applications, such as in sealants, or may be directly compounded with some polymers and/or inorganic fillers for the provision of mechanical goods.

2) Bitumen-diluted rubberized concentrate may be used, independently or combined with different polymers and/or other additives, in order to prepare a broad range of final products. These products are suitable for diverse bituminous applications in the paving, roofing, coatings, waterproofing and industrial product markets. The rubberized concentrate may be used with regular AC, air blown AC and/or polymer-modified asphalt:
    as an independent modifier with no rubber phase separation at different dilution levels
    as a co-modifier in combination with synthetic rubber to provide a stabilized combination composition
    as a stabilizer in the in-situ reactive stabilization of polyolefinic plastic dispersion in hot liquid bitumen, in which case, the treated vulcanizate is a substitute for the non-vulcanizate rubber component in the In-Situ Steric Stabilization Process of WO 93/07219.

EXAMPLES

In the Examples which follow, the stability of the bituminous compositions during hot storage was evaluated using a Polymer Separation Test of conditioned asphalt samples as follows. The conditioning procedure consists of placing approx. 70 g of the binder in ¾" aluminum tubes and storing such tubes in a vertical position at 320° F. in a oven for 48 hr (or 2 days). Following hot storage, a viscosity ratio was determined by comparing the viscosity of the binder tested at 275° F. or 356° F. from the top section of the tube with the binder and from the bottom section of the tube. A ratio in the range of 0.80 to 1.20 is generally considered acceptable with respect to separation of the dispersed phase.

Usually, if the viscosity for the polymer modified bitumen systems before hot storage is about 3000 cp or below at 275° F., the storage condition specified at 320° F. for 48 hr is commonly acceptable. However, if the viscosity is higher due either to high loading of polymer in bitumen or to the bitumen itself (for example, oxidized bitumen), the polymer phase separation (if unstable) in bitumen may be relatively slower in some cases. It is necessary either to dilute the composition to a lower polymer inclusion level or to use a higher storage temperature and/or longer time to insure that the stability/non-stability of polymers included in bitumen medium are correctly reflected.

Mixing in all Examples was effected in a 1 liter mixing vessel using Brinkman Polytron high shear (Model PT45/80) homogenizer.

Example 1

A first series of experiments was carried out using both a conventional procedure and a procedure according to the invention to provide the same final compositions of crumb rubber in the same type of bitumen to permit direct comparison. The results of this set of experiments are shown in Table 2 below.

Four scrap rubber vulcanizate sources from three different manufacturers were used in this set of experiments. The scrap rubber vulcanizates came from the side-wall of tires but may be formulated differently by each manufacturer. The mesh sizes of the ground rubbers (GRs) were quite different varying from ½" to 100 mesh. The specified mesh no. with each GR specified in Table 2 is an average value.

The bitumen used in this set of experiments had the same viscosity grade (AC-5) with the following properties: 148 dmm penetration at 77° F., 113° F. softening point and 233 cp Brookfield viscosity at 275° F.

A series of blends of four different crumb rubbers and the bitumen (AC-5) at different blending ratio (5%, 8% and 12% by wt as shown in Table 2) were prepared respectively using conventional steps as described in the prior art.

The bitumen was heated to 356° F. in the mixer followed by dispersing the ground rubber particles under high shear at higher temperature around 392° F. for 2 hours. Although the swollen crumb rubber particles were fully dispersed under such high shear mixing, they were not broken down and/or digested into bitumen at the low rubber loadings of less than 15% by weight. The results for all compositions indicated that the rubbers treated in the conventional steps (i.e. prior art) tended to show phase separation (or crumb rubber sedimentation at the bottom) from the hot liquid bitumen during storage without agitation. However, the results also showed differences to a certain degree in the rate of phase separation because of both the different crumb sources at the same loading and the different loadings for the same source. Nevertheless, all treated crumb under the conventional wetting process conditions were not stable in hot liquid bitumen.

Using the inventive procedures on the same compositions, a rubberized concentrate was first formed and then diluted with bitumen to the final composition tested, in which the treated crumb rubber was stabilized in the binder at any lesser concentration of rubber.

In this set of experiments, the rubberized concentrates were prepared using an incremental loading procedure in the same high shear mixer. About 17% by wt of the crumb rubber initially was added while stirring to hot liquid bitumen at about 356° F. A high viscosity mixture, which was still workable or processable in the Polytron high shear mixer, was provided at this initial loading level. The blending was carried out under high shear force for half hour at around 392° F. The viscosity of the mixture started to drop down to a point where it was possible to make an incremental loading of the crumb rubber to the mixture, yielding a final loading at 25% by wt for this Example. The mixture then was subjected to the same high shear conditions. The total processing time was 2 hours to provide a smooth rubberized concentrate mixture in which all crumb vulcanizate added was digested and/or incorporated into bitumen. The resulting concentrates were diluted with the same bitumen to different rubber loadings in the final compositions, the same as in the conventional prior art examples. All compositions prepared from four sources of crumb rubber at different loadings according to the invention (shown in Table 2) were stable, and exhibited no residual crumb rubber sedimentation during storage.

were well dispersed in the bitumen under high shearing mixing at high temperatures form 428° F. to 464° F., they were still not broken down and/or digested into bitumen. The result also showed a higher rate of phase separation at same rubber loading during hot storage in comparison with the results on different type of tire rubber in Example 1.

A blend with the GR-5 at the same rubber load was also prepared (see sample GR-5-3 shown in Table 3) according to the principle taught in the prior art (EP 0439232). The tire rubber (GR-5) was mixed at 338° F. under high shear and

TABLE 2

Conventional Procedure

| Ingredient\Code | GR-1-1 | GR-1-2 | GR-1-3 | GR-2-1 | GR-2-2 | GR-2-3 | GR-3-1 | GR-3-2 | GR-3-3 | GR-4-1 | GR-4-2 | GR-4-3 | Diluted GR-4-3 |
|---|---|---|---|---|---|---|---|---|---|---|---|---|---|
| Bitumen (AC-5) | 95 | 92 | 88 | 95 | 92 | 88 | 95 | 92 | 88 | 95 | 92 | 88 | 95 |
| GR-1 (80 mesh) | 5 | 8 | 12 | | | | | | | | | | |
| GR-2 (40 mesh) | | | | 5 | 8 | 12 | | | | | | | |
| GR-3 (20 mesh) | | | | | | | 5 | 8 | 12 | | | | |
| GR-4 (40 mesh) | | | | | | | | | | 5 | 8 | 12 | 5 |
| Stability data (2 days at 320° F.) | | | | | | | | | | | | | |
| Viscosity, cp at 135° C. | | | | | | | | | | | | | |
| at Top section | 293 | 613 | 1422 | 325 | 425 | 1082 | 335 | 475 | 1705 | 321 | 950 | 3275 | 340 |
| at Bottom section | 1363 | 1270 | 2965 | 1227 | 1698 | 4440 | 1323 | 3015 | 3195 | 1148 | 1280 | 3445 | 2420 |
| Stability index (ratio) | 0.21 | 0.48 | 0.48 | 0.26 | 0.25 | 0.24 | 0.25 | 0.16 | 0.52 | 0.28 | 0.74 | 0.95 | 0.14 |
| Storage Stability | no | no | no | no | no | no | no | no | no | no | no | no* | no |

Invention Procedure

| Ingredient\Code | DGR-1-1 | DGR-1-2 | DGR-1-3 | DGR-2-1 | DGR-2-2 | DGR-2-3 | DGR-3-1 | DGR-3-2 | DGR-3-3 | DGR-4-1 | DGR-4-2 | DGR-4-3 |
|---|---|---|---|---|---|---|---|---|---|---|---|---|
| Bitumen (AC-5) | 95 | 92 | 88 | 95 | 92 | 88 | 95 | 92 | 88 | 95 | 92 | 88 |
| GR-1 (in rubberized concentrate with 25% GR-1) | 5 | 8 | 12 | | | | | | | | | |
| GR-2 (in rubberized concentrate with 25% GR-2) | | | | 5 | 8 | 12 | | | | | | |
| GR-3 (in rubberized concentrate with 25% GR-3) | | | | | | | 5 | 8 | 12 | | | |
| GR-4 (in rubberized concentrate with 25% GR-4) | | | | | | | | | | 5 | 8 | 12 |
| Stability data (2 days at 320° F.) | | | | | | | | | | | | |
| Viscosity, cp at 135° C. | | | | | | | | | | | | |
| at Top section | 510 | 890 | 1635 | 553 | 943 | 1672 | 425 | 713 | 1163 | 490 | 840 | 1535 |
| at Bottom section | 515 | 875 | 1620 | 523 | 900 | 1690 | 435 | 688 | 1120 | 507 | 850 | 1540 |
| Stability index (ratio) | 0.99 | 1.02 | 1.01 | 1.06 | 1.05 | 0.99 | 0.98 | 1.04 | 1.04 | 0.97 | 0.98 | 1.00 |
| Storage Stability | yes | yes | yes | yes | yes | yes | yes | yes | yes | yes | yes | yes |

*Unstable with its dilution sample at 5% level of rubber

Example 2

In a second set of experiments, the bitumen used was the same asphalt (AC-5) as used in Example 1. Tire rubber was ground rubber (designated GR-5) manufactured from discarded tires. GR-5 had a particle size on average about 40 mesh and was produced from passenger tire (with fiber and wire removed) by Baker Rubber Inc. A process oil employed was a hydrolene recycling agent (H-90) having total aromatics of 83.6%, saturates of 16.3% and asphaltenes of 0.1%.

The blends of this GR with the bitumen at two different rubber loading (5% and 7.5% by wt) were carried out by using the conventional prior art method (as shown in Table 3 below). The GR-5 unlike the type of vulcanizate used in Example 1, needed to be swollen sufficiently in the bitumen containing a certain portion of the process oil. Following the conventional steps, although the swollen GR-5 particles then transferred to a separate vessel and subjected to a low shear agitation to circulation at a higher temperature at 410° F. for 10 more hours. The result indicated that the rubber treated according to the conditions of EP 0439232 also tended to show phase separation during storage without agitation.

Using the inventive procedure to achieve the same final composition, a rubberized concentrate was first formed and then diluted with bitumen to the final specified composition to be tested.

The rubberized concentrate with GR-5 rubber was prepared using an incremental loading procedure in the same high shear mixer. About 20% by wt of the crumb rubber was added while stirring to hot liquid bitumen/process oil blend at 1:1 ratio. The high viscosity of the mixture, which was still workable or processable in the Polytron high shear mixer, was achieved from this starting effective loading level together with a higher degree of swelling of the dispersed; rubber particles. The blending was carried out under high shear force for one and half hours at around 464° F. The viscosity of the mixture started to drop down to a point where an incremental loading of the rubber was possible, achieving a final loading at 50% by wt for this example, which is shown in Table 4 below. The mixture was subjected to the same high shear condition and a total processing of time was about 4 hours, to yield a smooth rubberized concentrate binder in which all crumb vulcanizate added was digested and/or incorporated into bitumen. The resulting concentrates were diluted with the same bitumen to the same final composition, which was stable without crumb rubber sedimentation at the bottom during storage (see the results in Table 3).

The diluted concentrate contains a devulcanized rubber which was used as a substitute for non-vulcanizate rubber as one of stabilizer components for preparing a stable polyethylene dispersion in the same bitumen used to prepare the concentrate, according to the procedure disclosed in prior art Steric Stabilization Process described in WO 93/07219. The result on this sample (DGR-5/PE-1) shown in Table 3 indicated that the devulcanized tire rubber was both compatible and reactive enough with the bitumen to function as an elastic layer which can stabilize the polyolefinic particulate phase according to the Steric Stabilization Process.

The GR-6 rubber was treated in bitumen-flux/processing-oil combination using the same procedure as for GR-5 described in Example 2. The rubberized concentrate from GR-6/flux/oil mixture was shown in Table 4. The bitumen flux came from Amoco Clark, which was identified as a type of bitumen for air blown applications. Properties of this bitumen (flux) were 302 dmm penetration at 77° F., softening point at 100° F. and 32 cp of Brookfield viscosity at 350° F. Bitumen (oxidized) was a typical roofing grade bitumen air blown (or oxidized) from the bitumen flux, having the following properties: 17 dmm penetration at 77° F., softening point at 212° F. and 770 cp of Brookfield viscosity at 350° F. Air blown bitumen is usually considered to be a very difficult bitumen to modify due to its very poor compatibility with polymers. The process oil used was the same as in Example 2. However, using the inventive procedure, the rubberized concentrates prepared were diluted with the air-blown bitumen to provide a highly stabilized rubberized bitumen product, as indicated in Table 5 below. It was more surprising to find that the digested tire rubber in air-blown asphalt was also both soluble and reactive enough in-situ to function as an elastic layer which stabilized the polyolefinic particulate phase in the air-blown asphalt (see result on this sample (DGR-6/PE-1) in Table 4).

TABLE 3

| Ingredient\Code | Comparative | | | | Inventive | |
|---|---|---|---|---|---|---|
| | GR-5-1 | GR-5-2 | GR-5-3 | GR-5/PE-1 | DGR-5-1 | DGR-5/PE-1 |
| Bitumen (AC-5) | 77.5 | 80 | 80 | 96.27 | 77.5 | 96.27 |
| GR-5 (40 mesh) | 7.5 | 5 | 5 | 0.38 | | |
| Process oil | 15 | 15 | 15 | 0.75 | | |
| GR-5 (in the concentrate RC-1*) | | | | | 7.5 | 0.38 |
| process oil (in the concentrate RC-1*) | | | | | 15 | 0.75 |
| Recycled Polyethylene (PE) | | | | 2 | | 2 |
| Maleic anhydride grafted PE | | | | 0.3 | | 0.3 |
| FPB (Hycar reactive rubber | | | | 0.2 | | 0.2 |
| Sulfur | | | | 0.1 | | 0.1 |
| Stability data (2 days at 320° F.) | | | | | | |
| Viscosity, cp at 275° F. | | | | | | |
| at Top section | 525 | 500 | 508 | 485 | 457 | 375 |
| at Bottom section | 2850 | 3250 | 3100 | 275 | 466 | 380 |
| Stability index (ratio) | 0.18 | 0.15 | 0.16 | 1.76 | 0.98 | 0.99 |
| Storage Stability | no | no | no | no | yes | yes |

*Rubberized Concentrate Composition shown in Table 4

TABLE 4

| Rubberized Concentrate Composition | | |
|---|---|---|
| INGREDIENT\CODE | RC-1 | RC-2 |
| Bitumen (AC-5) | 25 | |
| Bitumen (flux type) | | 25 |
| Process oil | 25 | 25 |
| GR-5 (40 mesh) | 50 | |
| GR-6 (30 mesh) | | 50 |

Example 3

Another rubber (designated as GR-6) used in a further experiment according to the procedure of Example 2, was a recycled rubber from a mixture of passenger tires and truck tires.

TABLE 5

| | GR Treated and LDPE stabilized with the treated GR in air blown asphalt | | | |
|---|---|---|---|---|
| | Comparative | | Inventive | |
| Ingredient\Code | GR-6-1 | GR-6/PE-1 | GR-6-1 | DGR-6/PE-1 |
| Bitumen (oxidized) | 80 | 85 | 80 | 85 |
| Bitumen (flux type) | 5 | 3 | 5 | 3 |
| process oil | 5 | 3 | | |
| GR-6 (30 mesh) | 10 | 6 | | |
| process oil (in the concentrate RC-2*) | | | 5 | 3 |
| GR-6 (in the concentrate RC-2*) | | | 10 | 6 |

TABLE 5-continued

GR Treated and LDPE stabilized
with the treated GR in air blown asphalt

|  | Comparative | | Inventive | |
|---|---|---|---|---|
| Ingredient\Code | GR-6-1 | GR-6/PE-1 | GR-6-1 | DGR-6/PE-1 |
| Recycled Polyethylene (PE) |  | 2 |  | 2 |
| Maleic anhydride grafted PE |  | 0.5 |  | 0.5 |
| FPB (Hycar reactive rubber) |  | 0.3 |  | 0.3 |
| Sulfur |  | 0.2 |  | 0.2 |
| Stability data (5 days at 425° F.) | | | | |
| Viscosity, cp at 375° F. | | | | |
| at Top section | 665 | 545 | 375 | 1740 |
| at Bottom section | 1000 | 2400 | 373 | 1780 |

TABLE 6

GR treated, stabilized and combined with elastomer in bitumen compositions

|  | Comparative Examples | | | | Inventive Examples | | |
|---|---|---|---|---|---|---|---|
|  |  |  |  | Diluted |  |  |  |
| Ingredient\Code | GR/SBS-1 | GR/SBS-2 | GR/SBS-3 | GR/SBS-3 | DGR/SBS-1 | DGR/SBS-2 | DGR/SBS-3 |
| Bitumen (AC-20) | 92.6 | 90.6 | 88.6 | 92.6 | 92.6 | 90.6 | 88.6 |
| GR-1 (80 mesh) | 6 | 8 | 10 | 6 |  |  |  |
| GR-1 (in rubberized concentrate with 25%) |  |  |  |  | 6 | 8 | 10 |
| SBS (Enichem 161B) | 1.25 | 1.25 | 1.25 | 1.25 | 1.25 | 1.25 | 1.25 |
| Sulfur | 0.15 | 0.15 | 0.15 | 0.15 | 0.15 | 0.15 | 0.15 |
| Stability data (2 days at 320° F.) | | | | | | | |
| Viscosity, cp at 275° F. | | | | | | | |
| at Top section | 1525 | 2045 | 3285 | 1070 | 1645 | 2163 | 2367 |
| at Bottom section | 2295 | 2815 | 3435 | 1665 | 1560 | 2273 | 2365 |
| Stability index (ratio) | 0.66 | 0.75 | 0.97 | 0.64 | 1.05 | 0.95 | 1.00 |
| Storage Stability | no | no | no* | no | yes | yes | yes |

*because its diluted sample at 6% level is unstable

TABLE 5-continued

GR Treated and LDPE stabilized
with the treated GR in air blown asphalt

|  | Comparative | | Inventive | |
|---|---|---|---|---|
| Ingredient\Code | GR-6-1 | GR-6/PE-1 | GR-6-1 | DGR-6/PE-1 |
| Stability Index (ratio) | 0.67 | 0.23 | 1.01 | 0.98 |
| Storage Stability | no | no | yes | yes |

*Rubberized concentrate composition shown in Table 4.

Example 4

The ground rubber (GR-1) was used again in a fourth set of experiments.

GR-1 was treated in a harder base bitumen (AC-20), using the same condition to prepare concentrate at 25% loading as described in Example 1.

Properties of the AC-20 base bitumen were 67 dmm penetration at 77° F., 115° F. softening point and 368 cp Brookfield viscosity at 275° F.

This rubberized concentrate was diluted with AC-20 base to 3 different concentration level (6%, 8% and 10% by wt) of crumb rubber, followed by dispersing 1.25% of SBS in the diluted concentrates at 356° F. for 30 min and then chemically reacting in-situ under high shear and at the same temperature with 0.15% of elemental sulfur for 90 more min.

In comparative examples, the process conditions and final compositions were the same as in the inventive examples, except that the ground rubber (GR-1) was directly treated in the composition without going through the rubberized concentrate based on the inventive procedure. The results shown in Table 6 below indicate that the final mixtures prepared with concentrate produced according to the procedure of this invention, with the same composition as in conventional Examples at three different loading were stable, without crumb rubber sedimentation at the bottom under standard storage conditions.

SUMMARY OF DISCLOSURE

In summary of this disclosure, the present invention provides a novel solution rubberized bitumen concentrate composition comprising the same and the procedure for the manufacture of the same. Modifications are possible within the scope of this invention.

What I claim is:

1. A stable rubberized bitumen concentrate, comprising: bitumen, and
dissociated rubber vulcanizate network comprising at least about 15 wt % of said composition and incorporated into the bitumen to the extent that rubber particles in the composition do not sediment as determined by the Polymer Separation Test and upon dilution by bitumen to a lower concentration of dissociated rubber vulcanate network.

2. The concentrate as claimed in claim 1 wherein said dissociated rubber vulcanate network comprises at least about 25 wt % of the composition.

3. The concentrate as claimed in claim 1 which is diluted by bitumen to a lower concentration of dissociated rubber vulcanate network.

4. A bituminous composition comprising bitumen and the concentrate of claim 1 as a modifier of said bitumen.

5. The composition of claim 4 wherein said modifier is an independent modifier of the bitumen.

6. The composition of claim 4 wherein said modifier is a co-modifier of the bitumen in combination with at least one synthetic rubber.

7. The composition of claim 6 wherein said synthetic rubber is elastomeric unsaturated polymer.

8. A stable bituminous composition comprising a dispersion of particulate polyolefin in bitumen wherein the concentrate of claim 1 comprises a component stabilizing said particulate polyolefin against sedimentation.

9. A method of forming a rubberized bitumen concentrate, which comprises:
   (A) providing a mass comprising:
      (a) bitumen, and
      (b) crumb rubber having a vulcanizate network in an initial amount of at least about 15 wt % of the mass, wherein said crumb rubber is swollen in-situ to form a vulcanizate network structure in the bitumen susceptible to dissociation of vulcanizate particles in a high shear field; and
   (B) subjecting said mass to sufficient shear and temperature conditions to effect dissociation of the vulcanizate network structure of the rubber particles to incorporate the vulcanizate into the bitumen to the extent that rubber particles in the composition do not sediment as determined by the Polymer Separation Test and upon dilution by bitumen to a lower concentration of dissociated rubber vulcanate network.

10. The method of claim 9 wherein said crumb rubber has a particle size from about ½ inch to about 200 mesh.

11. The method of claim 10 wherein said particle size is about 10 to about 80 mesh.

12. The method of claim 9 wherein said mass further comprises a process oil added to promote swelling of the crumb rubber and to increase the solvency power of the bitumen.

13. The method of claim 9 wherein said mass is subjected, by said shear and temperature conditions, to thermal and mechanical energy at a shear stress at least sufficient to effect intra-particulate friction and shearing to effect breakdown of the vulcanizate network under the influence of the shear stress applied to the mass of particles.

14. The method of claim 9 wherein at least one additional loading of crumb rubber is made to the rubberized concentrate and the method is repeated to incorporate digested vulcanizate network from said at least one additional loading into the rubberized bitumen concentrate.

15. The method of claim 9 including diluting said rubberized bitumen concentrate to a lower concentration of incorporated rubber particles.

16. The method of claim 9 wherein said shear and temperature conditions are applied for a time which results in any carbon black particles released from the rubber particles remaining dispersed and resistant to sedimentation.

* * * * *